United States Patent [19]

Yamada

[11] Patent Number: 4,802,229
[45] Date of Patent: Jan. 31, 1989

[54] IMAGE PROCESSING SYSTEM

[75] Inventor: Masanori Yamada, Kawasaki, Japan

[73] Assignee: Canon Kabushiki Kaisha, Tokyo, Japan

[21] Appl. No.: 78,000

[22] Filed: Jul. 24, 1987

Related U.S. Application Data

[63] Continuation of Ser. No. 597,934, Apr. 9, 1984, abandoned.

[30] Foreign Application Priority Data

Apr. 12, 1983 [JP] Japan ................................. 58-63853
Apr. 12, 1983 [JP] Japan ................................. 58-63854

[51] Int. Cl.$^4$ ............................................. G06K 9/00
[52] U.S. Cl. .................................... 382/1; 355/14 SH; 358/285; 358/293; 382/46; 382/48; 382/61
[58] Field of Search ..................... 382/1, 46, 48, 61; 355/14 SH, 14 C, 14 TR; 358/280, 293, 294, 285; 356/138; 250/562, 563

[56] References Cited

U.S. PATENT DOCUMENTS

| 4,172,994 | 10/1979 | Bergkvist | 356/138 |
| 4,300,123 | 11/1981 | McMillin et al. | 382/61 |
| 4,390,872 | 6/1983 | Murakami et al. | 340/715 |
| 4,439,790 | 4/1984 | Yoshida | 358/256 |
| 4,522,486 | 6/1985 | Clark et al. | 355/14 SH |
| 4,529,318 | 7/1985 | Curl | 250/562 |
| 4,533,959 | 8/1985 | Sakurai | 382/46 |
| 4,558,461 | 12/1985 | Schlang | 382/46 |
| 4,561,765 | 12/1985 | Masuda | 355/14 SH |
| 4,672,461 | 6/1987 | Yoshida | 358/280 |
| 4,675,741 | 6/1987 | Shinohara | 358/293 |

FOREIGN PATENT DOCUMENTS 56-120264 9/1981 Japan .

Primary Examiner—Leo H. Boudreau
Attorney, Agent, or Firm—Fitzpatrick, Cella, Harper & Scinto

[57] ABSTRACT

An image processing system comprises means for detecting the position of an original, means for judging the tilt, the bending and the presence of the original and means for giving a warning or controlling any useless processing operation, thereby desirably editing and printing out the original without wasting copy papers, toner, time, power and the like.

27 Claims, 14 Drawing Sheets

FIG. 3
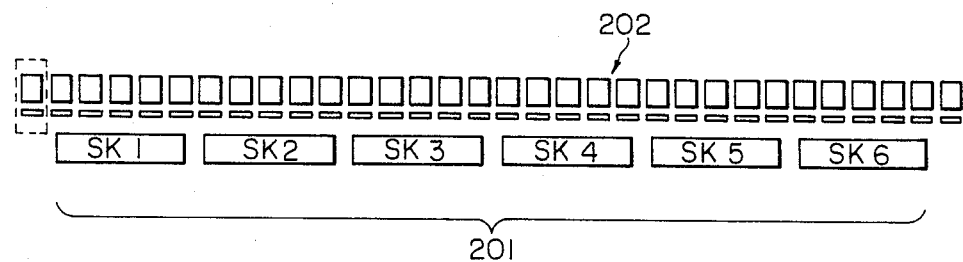
FIG. 4
FIG. 5-1
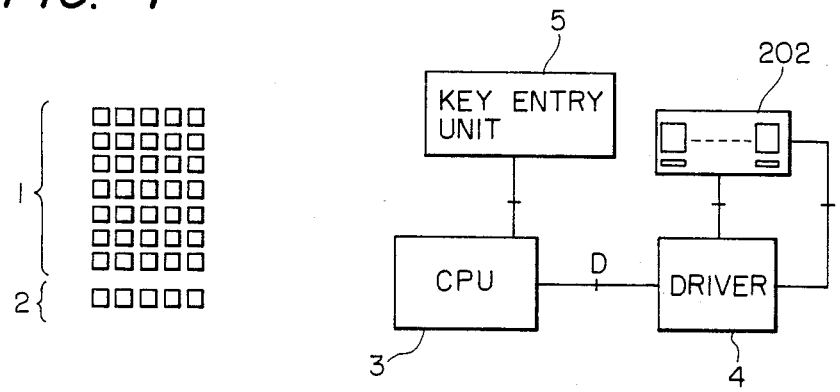

FIG. 9

| tan x (INTEGER) | x (°) | DISPLAY ANGLE |
|---|---|---|
| 0 | 90 | (0) |
| 1 | 45 | 45 |
| 2 | 63 | 27 |
| 3 | 72 | 18 |
| 4 | 76 | 14 |
| 5 | 79 | 11 |
| 6 | 81 | 9 |
| 7 | 82 | 8 |
| 8 | 83 | 7 |
| 9~10 | 84 | 6 |
| 11~12 | 85 | 5 |
| 13~16 | 86 | 4 |
| 17~22 | 87 | 3 |
| 23~38 | 88 | 2 |
| 39~59 | 89.0 | 1.0 |
| 60~67 | 89.1 | 0.9 |
| 68~75 | 89.2 | 0.8 |
| 76~88 | 89.3 | 0.7 |
| 89~104 | 89.4 | 0.6 |
| 105~127 | 89.5 | 0.5 |
| 128~163 | 89.6 | 0.4 |
| 164~229 | 89.7 | 0.3 |
| 230~381 | 89.8 | 0.2 |
| 382~432 | 89.9 | 0.1 |

FIG. 11-1

WARNING 1
| "ORIGINAL SHEET IS NOT SET" |

WARNING 2
| "ORIGINAL SHEET IS DISLOCATED BY 5°" |

NORMAL DISPLAY
| NO EDIT /// | 100% /// | ETC |

[SK1] [SK2] [SK3] [SK4] [SK5] [SK6]

SEL 1 = 0   SEL 3 = 0

SEL 1 = 0   SEL 3 = 1

SEL 1 = 1   SEL 3 = 0

SEL 1 = 1   SEL 3 = 1

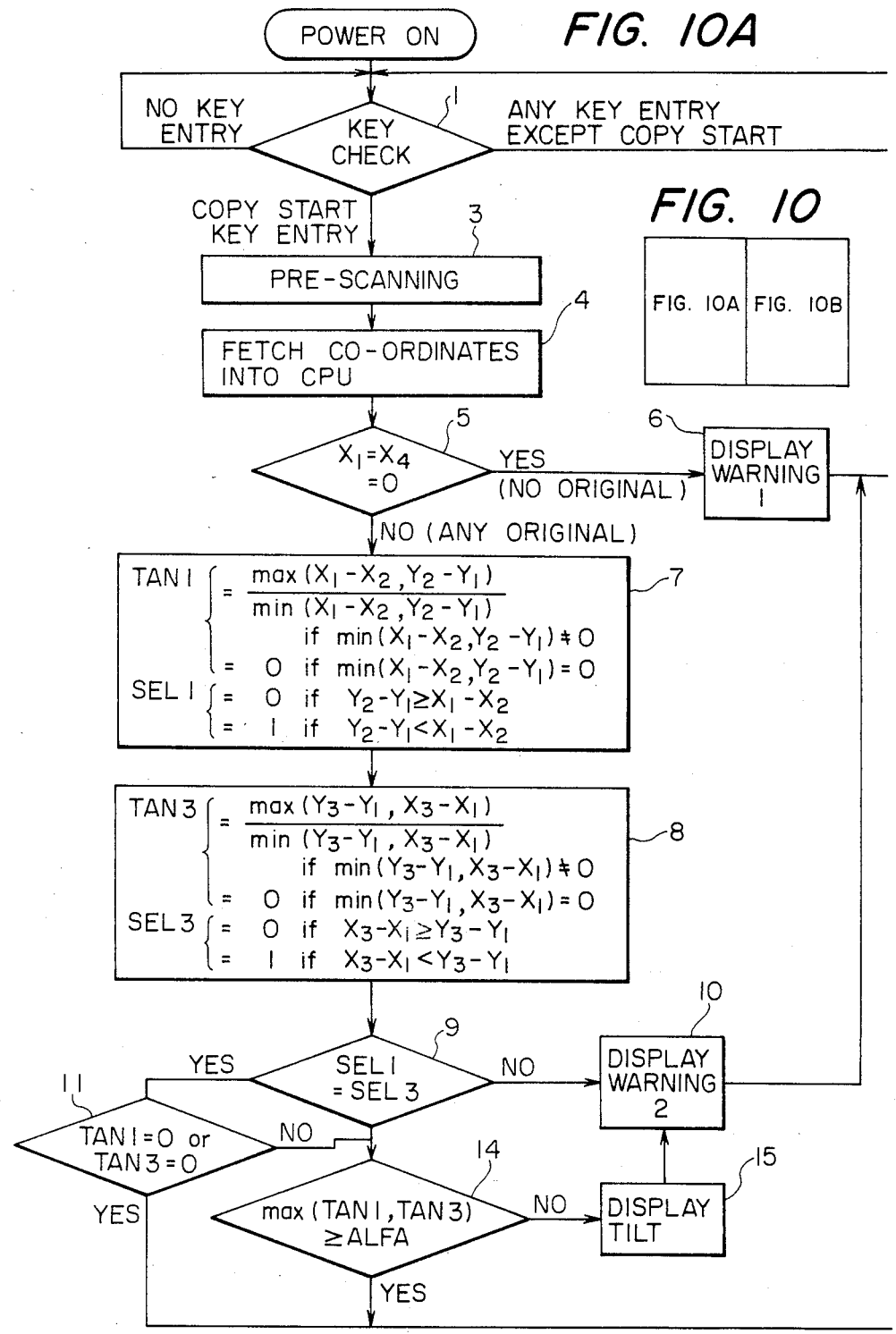

IMAGE PROCESSING SYSTEM

This application is a continuation of application Ser. No. 597,934, filed Apr. 9, 1984, now abandoned.

BACKGROUND OF THE INVENTION

Field of the Invention

The present invention relates to an image processing apparatus or system such as a copying machine, a facsimile and the like.

Description of the Prior Art

In a conventional copying machine of the type which is provided with ADF (automatic document feed) or DF (document feed), in particular, copying operation with no original on an original mount causes an increase in the waste of copy paper.

Also, in a conventional copying machine or the like, an original which should have been placed straight on a platen may be tilted or bent due to the air pressure produced when an original retaining plate is lowered, causing an unexpected failure in copying, or a user may have to make copies again and again due to a difficulty in placing straight a thick original such as a book, inadvantageously leading to waste of copy paper, toner, time, power and the like.

SUMMARY OF THE INVENTION

An object of the present invention is to provide an image processing apparatus or system which is free from the above mentioned drawbacks.

Another object of the present invention is to provide an image processing apparatus or system which judges the presence of an original and gives a warning or controls the reproducing operation to avoid useless image processing operations.

A further object of the present invention is to provide an image processing apparatus or system which detects the bending of an original and gives a warning or inhibits the reproducing operation.

Still a further object of the present invention is to provide an image processing apparatus or system which detects the inclination of an original, judges a tilt in excess of a predetermined angle, and gives a warning or inhibits the reproducing operation.

Still a further object of the present invention is to provide an image processing apparatus or system capable of displaying the dip of the original.

Still a further object of the present invention is to provide an image processing apparatus or system in which the presence of an original or the state of the original such as a tilted or bent state is detected by detecting and judging the positional coordinates of the original.

Still a further object of the present invention is to provide an image processing apparatus or system of the type which reads the content of an original by means of a sensor such as a CCD, converts it into an electric signal and reproduces the signal and in which the state of the original is detected utilizing reading as a CCD or the like.

Still a further object of the present invention is to provide an image processing apparatus or system which facilitates the key entry sequence after the original state detection.

Still a further object of the present invention is to provide an improved original reader for use when a device for automatically feeding and setting originals is used.

Still a further object of the present invention is to provide an improved apparatus or system capable of reading and printing an original in real time.

The above and other objects of the present invention will be apparent from the following description of a preferred embodiment of the present invention.

BRIEF DESCRIPTION OF THE DRAWINGS

FIG. 1-2 shows the structure of the copying machine according to the embodiment of the present invention.

FIG. 2 shows a control console of the copying machine in FIG. 1.

FIG. 3 is a detailed view of a display 202 and function keys 201 on the control console in FIG. 2.

FIG. 4 is an enlarged view of the display 202 in FIG. 3.

FIG. 5-1 is a block diagram of a liquid crystal display according to an embodiment of the present invention.

FIG. 5-2 shows how FIGS. 5-2A and 5-2B are assembled to form a system block diagram of a reader unit.

FIGS. 6-1, 7-1, 7-2 and 8 respectively show states that an original may be placed on a platen 903 of a reader A in FIG. 1-2.

FIG. 6-2 is a circuit diagram of an original position detector.

FIG. 9 is a table showing the values of arc tangent and dips of an original displayed on the display 202.

FIG. 10 shows how FIGS. 10A and 10B are assembled to form a flowchart of the dip calculation sequence.

FIGS. 11-1 to 11-3 show examples displayed on the display 202, and

FIGS. 12-1 to 12-4 show inclinations of sides $L_1$ and $L_3$ of the original in FIG. 8.

DETAILED DESCRIPTION OF THE PREFERRED EMBODIMENTS

Figure 1:
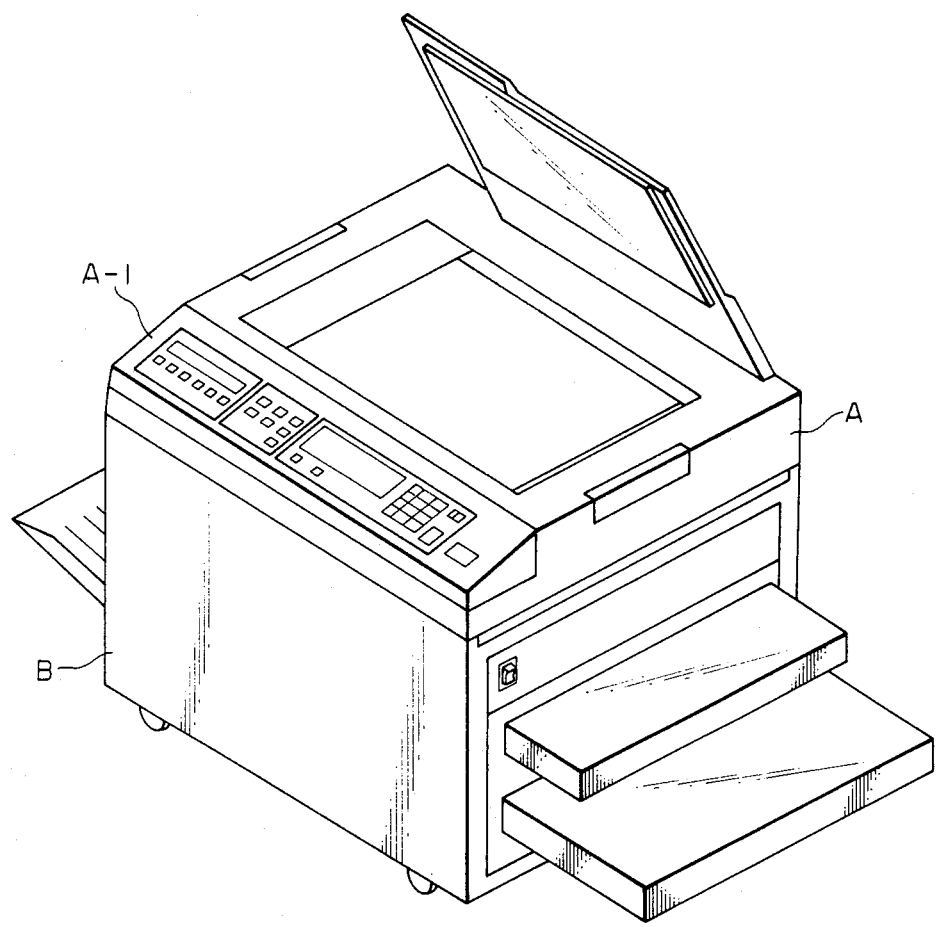
FIG. 1-1 is an outside view of a copying machine according to an embodiment of the present invention.

FIG. 1-1 shows an outside view of a copying machine and a control console thereof according to an embodiment of the present invention. The present apparatus basically comprises two units, a reader A and a printer B. The reader A is provided with a control console A-1.

Figures 1, 2:
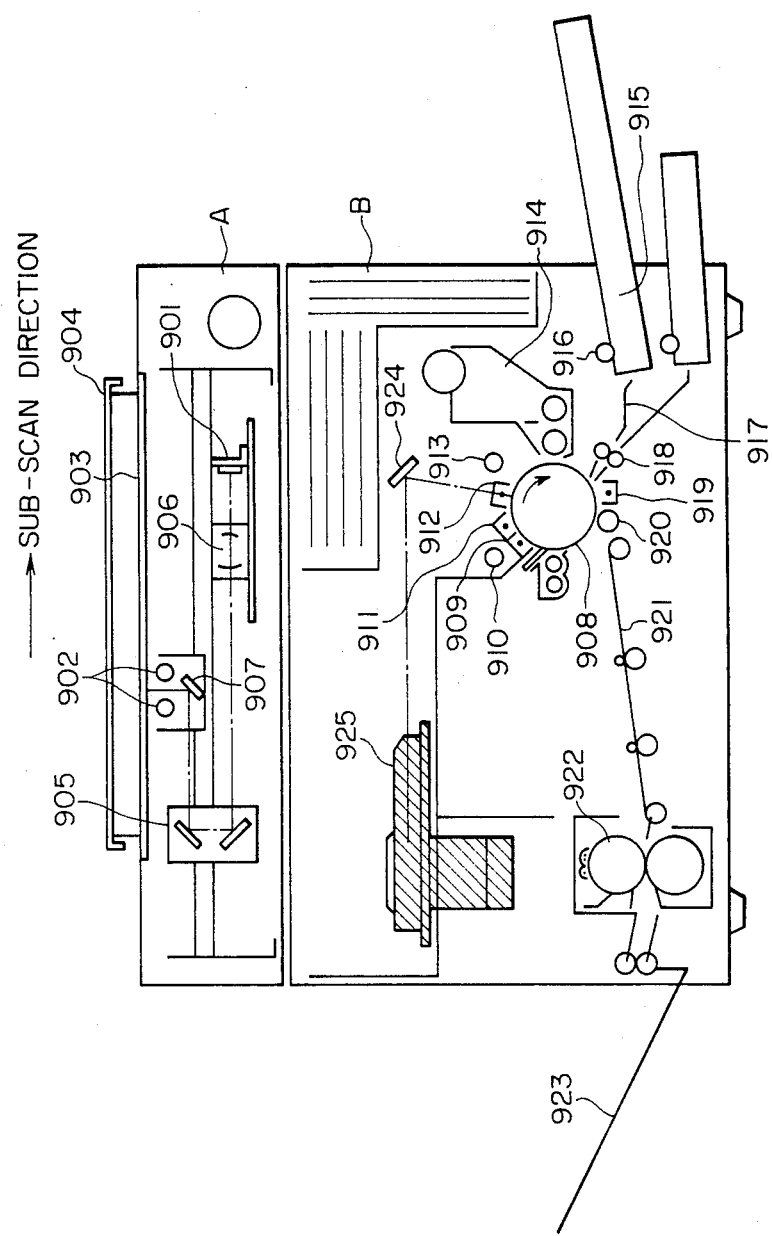
Figure 2:
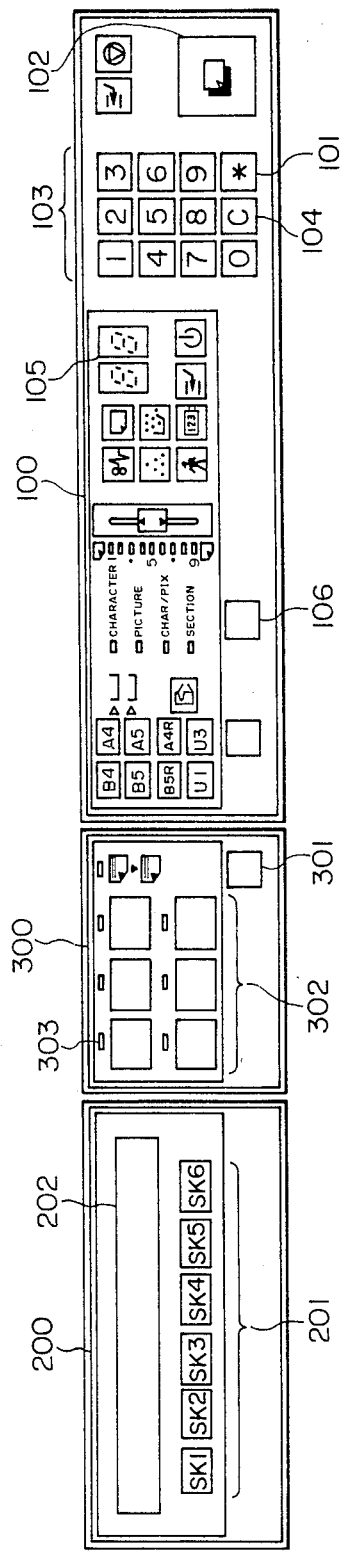

FIG. 1-2 is a sectional view showing the structure of the copying machine according to the embodiment of the present invention.

An original is placed in a face-down orientation on an original mount glass 903. A reference position for mounting is on a left inner side as viewed from the front. The original is pressed onto the original glass by an original cover 904. The original is illuminated by a fluorescent lamp 902 and a light path is so formed that a reflected light therefrom is focused onto a CCD 901 through mirrors 905 and 907 and a lens 906. The mirrors 907 and 905 are so arranged as to move at a relative speed of two to one. The optical unit including lamp 902 and mirrors 907 is moved at a constant speed from left to right by a PLL DC servo motor. The moving speeds are 180 mm/sec in a forward run during which the original is illuminated and 468 mm/sec in a return run. A resolution power in the sub-scanning direction is 16 lines/mm. Sizes of the originals which can be processed range from A5 to A3, and orientations thereof are vertical for A5, B5 and A4-sized ones and horizontal for B4 and A3-sized ones. Three return points for the optical unit are provided so as to cope with the originals of different sizes. A first point which is common to A5, B5 and A4 is at a 220 mm position apart from the original reference position, a second point for B4 is 364 mm apart and a third point for A3 is 431.8 mm apart.

The width of main scanning reaches to 297 mm corresponding to the lateral length of the A4-sized original depending on the orientation of the original. In order to resolve the original in the main scanning direction at 16 pels/mm, the CCD requires 4752 (=297×16) bits. Thus, in the present apparatus, two 2628-bit CCD array sensors which are serially connected and driven in parallel for simultaneous scanning are used. Then, under the conditions of 16 lines/mm and 180 mm/sec, a main scan period T (=storage time of the CCD) is equal to $$\frac{1}{v \cdot n} = \frac{1}{180 \times 16} = 347.2 \ \mu sec.$$

The transfer rate of the CCD is $$f = \frac{N}{T} = \frac{2628}{347.2 \ \mu sec} = 7.569 \ MHz.$$

The printer provided under the reader will be described with reference to FIGS. 1-1 and 1-2. An image signal obtained by processing a signal from the CCD into a bit serial form in the reader is inputted to a laser scan optical unit 925 of the printer. The optical unit includes a semiconductor laser, a collimetor lens, a rotating polygonal mirror, an F-θ lens and a correction optical system. The image signal from the reader is applied to the semiconductor laser in which, in turn, the signal is electrooptically converted. A laser light emitted therefrom is collimated by the collimetor lens and incident on the polygonal mirror which is rotated at a high speed, thus scanning a photosensitive member 908 with the laser light. The polygonal mirror is rotated at 2,600 rpm. The scan width is approximately 400 mm and the effective image width is 297 mm corresponding to the lateral length of the A4-sized original. Thus, the signal frequency applied to the semiconductor laser at that time will be about 20 MHz (NRz). The laser light from the unit is reflected to the photosensitive member 908 through a mirror 924.

The photosensitive member 908 consists of three layers, that is, for example, a conductive layer, a photosensitive layer and an insulating layer or two layers, such as a conductive layer and a photosensitive layer of amorphous silicon or the like. Process components for forming an image on the photosensitive member are provided. 909 is a pre-discharger, 910 is a pre-discharge lamp, 911 is a primary charger, 912 is a secondary charger, 913 is a front exposure lamp, 914 is a developing unit, 915 is a paper feed cassette, 916 is a paper feed roller, 917 is a paper feed guide, 918 is a registration roller, 919 is a transfer charger, 920 is a separation roller, 921 is a convey guide, 922 is a fixing unit, and 923 is a tray. The speed of the photosensitive member 908 and the convey system is 180 mm/sec which is the same as that of the forward movement of the reader. Thus, the copying speed when the reader and the printer are combined will be 30 sheets/min for the A4-sized original. The printer uses a separation belt in order to separate copy papers adhered to the photosensitive drum. Accordingly, a portion of an image corresponding to the belt width is missing. If a signal is entrained on that portion, it is developed, the separation belt is stained with the toner and the succeeding papers are also stained therewith, so that the reader cuts the video signal for the print out at the area corresponding to the separation belt width (8 mm). Also, if the toner is deposited onto the leading edge of the copy paper, the paper would be wrapped on the fixing roller during fixing and jammed, so that the portion of the signal corresponding to the leading edge of the paper is cut out in order to prevent toner deposition on the leading edge of 2 mm in width in the reader.

FIG. 2 is a detailed view of the control consol A-1 in FIG. 1-1. The control console is roughly divided into three blocks. 100 is a general key unit for a conventional copying machine, 101 is an entry key for entering data to a key data memory, 102 is a copy start key, 103 are ten data keys, 104 is a clear reset key, 105 is a numeric data display, and 106 is an original selecting key. 200 is a soft key unit by which the user can create copying functions at will, in which 201 are function keys (soft keys SK 1 to SK 6) and 202 is a liquid crystal display on which various messages, labels of the soft key 201 and other modes and data are displayed.

300 is a preset key unit for the registration, synthesization or re-reading of a copy transmission function which is created by the user. The preset key unit 300 is structurally label writable in order to label the name of a function created by the user. Six preset keys are provided, so that the user can register six functions. 303 is a preset key display on which the preset location is displayed, and 301 is a standard mode key (for returning to the real size reset mode) which is one of reset keys.

Figures 1, 12:
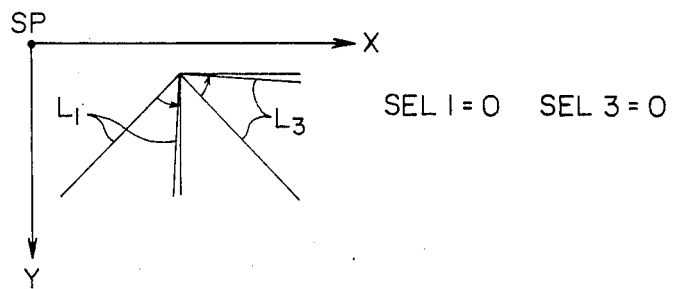
Figures 2, 12:
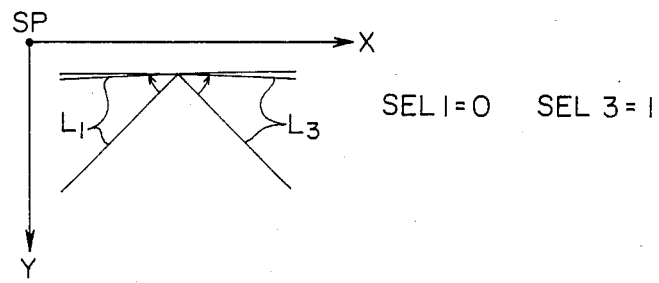
Figures 3, 12:
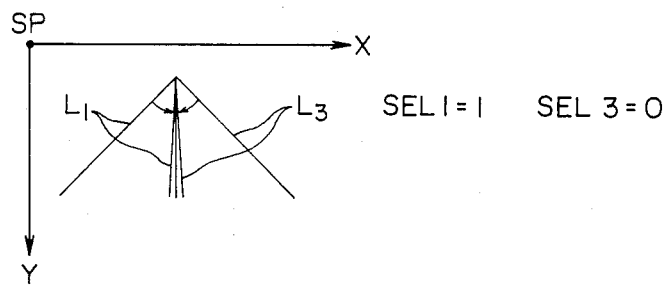

FIG. 3 is a detailed view of the display 202 and the function keys 201. The display 202 utilizes 5×7 dot matrix liquid crystal displays for 32 characters.

Figures 4, 12:
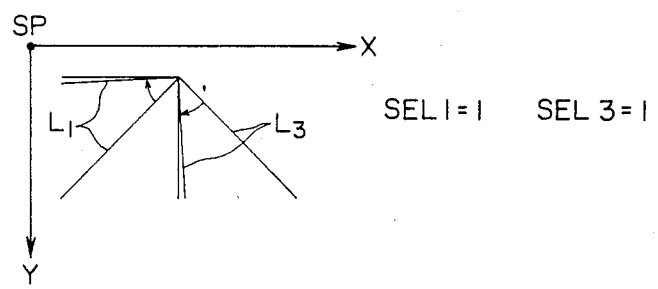

FIG. 4 is an enlarged view of a display for one character (surrounded by dotted lines in FIG. 3), in which 1 is a 5×7 dot liquid crystal display on which a character is displayed and 2 is a 5×1 dot display for a cursor.

Figures 2, 2A, 5:
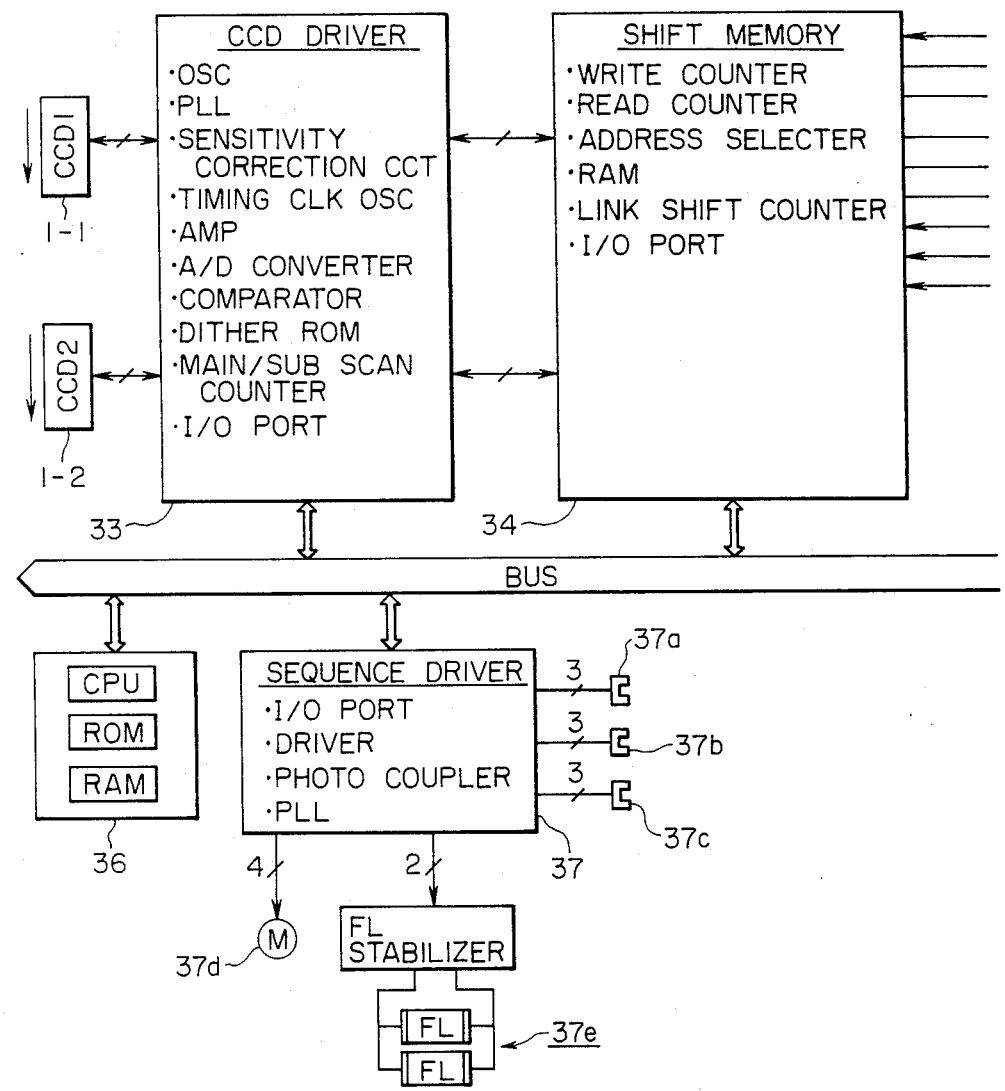

FIG. 5-1 is a block diagram of the liquid crystal display according to the embodiment of the present invention, in which 3 is a CPU for judging the keyed data from the key entry unit in FIG. 2 and sending displayed liquid crystal address and displayed character data to a liquid crystal driver 4 via a line D.

Figures 2B, 5:
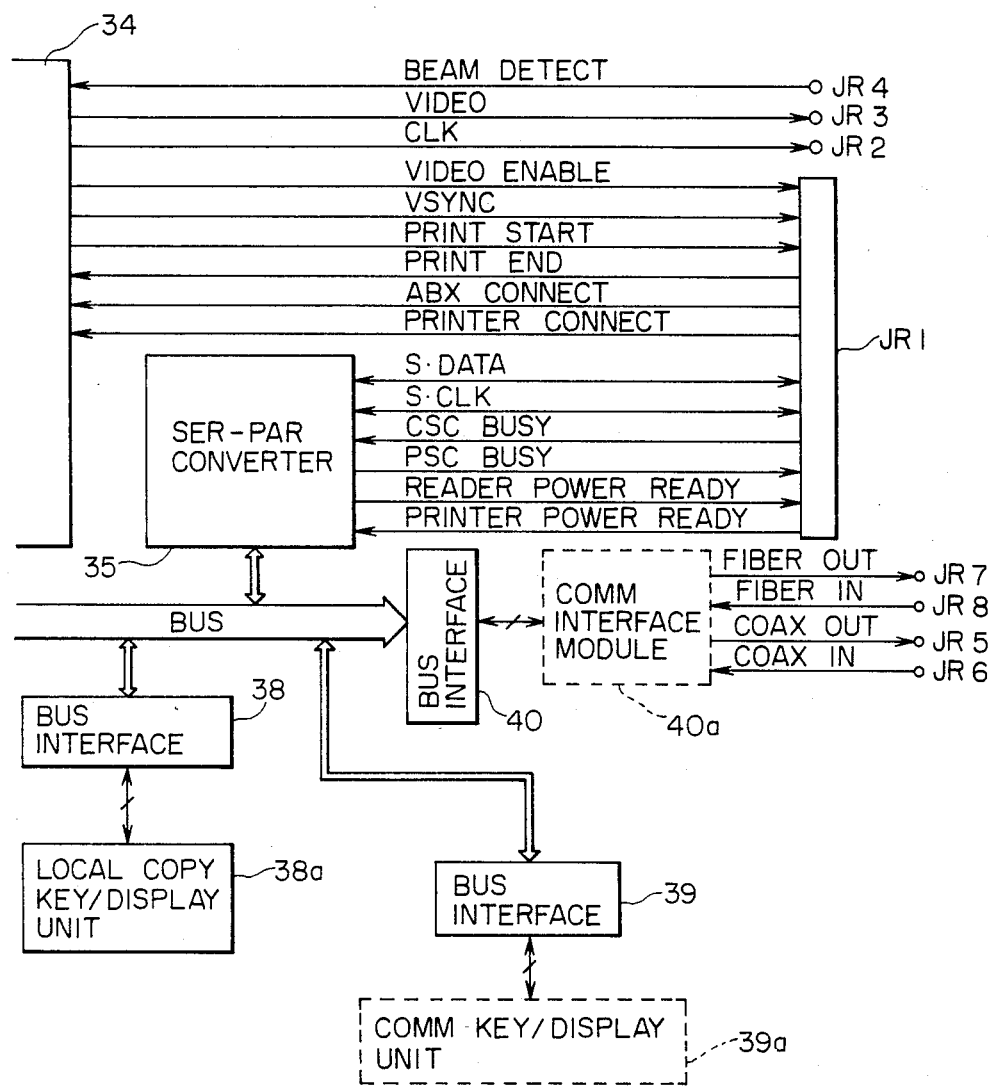

Next, the reader unit will be described in detail with reference to FIGS. 5-2A and 5-2B showing the system block diagram thereof.

In the drawing, 1-1 and 1-2 are CCDs, 33 is a CCD driver circuit for driving the CCDs and standardizing the outputs therefrom, 34 is a shift memory for processes such as trimming, shifting and magnification/reduction of the output from the driver circuit 33, 35 is a serial-to-parallel data converter for protocoling with the printer, 36 is a microcomputer which sends and receives control data to and from the respective blocks through a bus line BUS, in addition to the coordinates detection, tilt judgement and the like which will be described later, and which includes a program ROM a data RAM, and a CPU 37 is a sequence driver which controls a moving sequence of the optical system for the sub-scanning. It receives signals from a home position sensor 37a provided on a moving path of the optical system, an image leading edge sensor 37b and print start position sensor 37c to control a sub-scan DC motor 37d and an exposure lamp 37e and it also contributes to the paper feeding and registration in the printer unit. The sensors are constructed by photointerrupters which are actuated by a light shielding cam in the mounting block for the first mirror 7. 38 is a bus interface for inputting and ouputting data to and from a unit 38a in the controller (console) A-1 and 39 is a bus interface for inputting and outputting corresponding data to and from a communication key/display unit 39a, not shown.

The interface signals to the reader are shown on the right-hand side of FIG. 5-2B. When the reader is connected to the printer, connectors JR1, JR2, JR3, and JR4 are respectively connected to connectors JP1, JP2, JP3 and JP4 in the printer which will be described later. When the reader and the printer are used as a set and communicate with an external unit, signals which should be sent to the connectors JR1, JR2, JR3 are temporarily sent to a communication interface module 40a from which the signals are sent to the connectors JR1, JR2 and JR3. The connector JR4 is directly connected to the printer connector JP4.

The heart of the control of the reader unit is the CPU 20 in the microcomputor 36. The roles of the CPU are to control the key/display unit, control the sequence, the optical fiber communication protocol and the printer protocol, presets values calculated in accordance with the image processing commands such as trimming from the key/display unit to the various counters (including write counter and read counter) within a discrete image processing circuit including the memory 34. Other roles include original coordinates detection, original tilt judgement, original present judgement, warning and the like. The CCD driver supplies a power supply and the timing signal to the CCDs 1-1 and 1-2 to drive them, receives photoelectrically converted serial signals of the original image from the CCDs in accordance with the timing thereof, and amplifies and analog-to-digital converts them to binary digitize the signals. The shift memory circuit block 34 includes two line memorys for storing two lines of image signals which are binary digitized for the two CCDs, an OR circuit for converting the two lines of image signal into a non-overlapping serial signal to produce a serial VIDEO signal of 4752 bits/line and a circuit for generating the above mentioned various timing signals including a CLK (clock) signal. The serial-to-parallel converter 35 is an interface unit to the CPU, which protocols with the CPU, that is, converts the serial signal from the printer to a parallel signal to permit the direct connection thereof with the bus line of the CPU. The sequence driver 37 includes interfaces to the three sensors provided on the path of the optical system, a light source fluorescent lamp driver circuit, a subscan DC motor driver circuit and a speed control PLL circuit. The bus interfaces 38 and 39 are interfaces to the control key, a 5×7-dot, 20-digit liquid crystal driver circuit and the CPU bus line BUS. Further, there is optionally provided a bus interface 40 for coupling a communication interface module 40a and the CPU for protocoling. Thus, the simultaneous printing and reading of an original respectively in the printer B and the reader A is possible without any memory for one page of the original.

Next, the automatic detection of original position will be described.

Figures 1, 6:
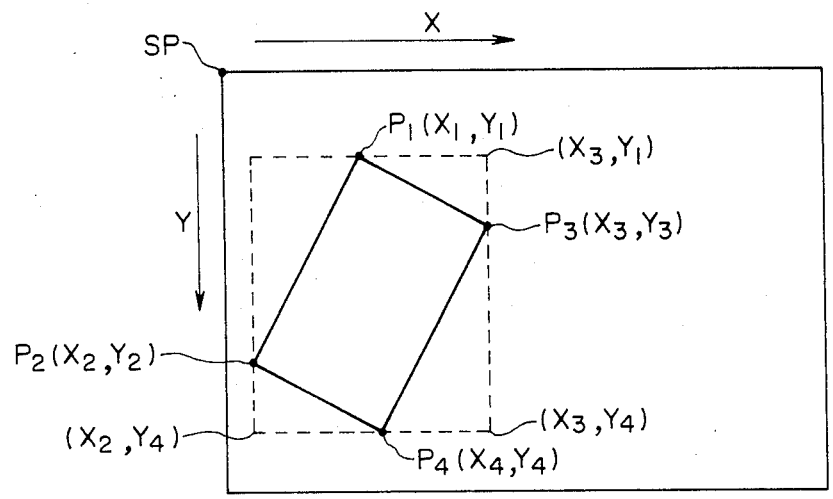

FIG. 6-1 shows the state when an original is being placed on the original mount of the reader A in FIGS. 1-1 and 1-2.

In FIG. 6-1, the optical system is moved for pre-scanning to detect coordinates $(X_1, Y_1)$, $(X_2, Y_2)$, $(X_3, Y_3)$ and $(X_4, Y_4)$ at four points obtained when the coordinates in the main- and sub-scanning directions from the reference point SP are respectively designated by X and Y during which the drum is being pre-rotated to make the photosensitive member 908 ready for precleaning and the like, by which the size and position of the original can be discriminated. Further, the scanning stroke of the optical system during multicopying operation can be determined and a desired cassette suitable for the size of the original can be selected. The original cover 904 (FIG. 1-2) is mirror finished such that the image data of regions except a region on which the original is placed would always be blackened. The pre-scanning is performed in the main- and sub-scanning directions in order to scan the entire surface of the glass and then the scanning for printing is performed. The pre-scanning speed in the sub-scanning direction is faster than that for printing.

Detecting the above four coordinates permits the judgment of presence, bending and tilt of an original, the automatic magnification/reduction suitable for a desired copy paper and the centering of the copy paper, which will be described in detail later.

The logic for detecting the above mentioned coordinates will be explained with reference to the circuit diagram in FIG. 6-2. The data from the CCDs is binary digitized by the pre-scanning and the image data VIDEO thus digitized are inputted into a shift register 501 in 8 bits. At the completion of the 8-bit inputting operation, a gate circuit 502 checks to see whether all of the 8-bit data are for white images or not and, if YES, outputs "1" on a signal line 503. F/F 504 is set when first 8-bit white data appears after the original scanning is started. The F/F is preset in advance by VSYNC (image leading edge signal from the sensor 37b) and remains in the set state until the next VSYNC comes out. When the F/F 504 is set, a value which is obtained from a main-scan counter 551 at that time is loaded to a latch F/F 505, which denotes the $X_1$-axis value. At the same time, a value in a sub-scan counter 552 is loaded to a latch 506, denoting the $Y_1$-axis value. Thus, $P_1 (X_1, Y_1)$ can be determined. The main-scan counter counts the main-scan transfer clocks from the CCDs and the sub-scan counter counts the main-scan lines (HSYNC).

A value from the main-scan counter is loaded to the latch 507 every time "1" is outputted on the signal line 503 and immediately stored in a latch 508 before the next 8-bit signal enters the shift register 501. The value which is loaded from the main-scan counter to the latch 508 when the first 8-bit white appears is compared with a data (set to "0" upon the receipt of the VSYNC) in a latch 510 in magnitude by a comparator 509. If the data in the latch 508 is greater, the data in the latch 508, that is, in the latch 507 is loaded to the latch 510 and the value in the sub-scan counter is loaded to a latch 511, which operation is processed before the next 8-bit signal enters the shift register 501. If the data in the latches 508 and 510 are thus processed with respect to the entire image, the maximum value in the X direction of the original will be left in the latch 510 and also the Y-axis value will be left in the latch 511, these values denoting $P_2 (X_2, Y_2)$ coordinates.

A F/F 512 is adapted to be set when the first 8-bit white data appears on each main scanning line. That is, it is reset with a horizontal synchronizing signal HSYNC (a signal for detecting the start of one-line scanning with a laser beam in the printer) and set with the first 8-bit white data, which state being maintained until the next HSYNC is received. When the F/F 512 is set, the value in the main scan counter is set in a latch 513 and loaded to a latch 514 until the next HSYNC comes out. The value thus loaded is then compared in magnitude with that in a latch 515 by a comparator 516. The maximum value in the X direction is preset in the latch 515 upon the generation of VSYNC. If the data in the latch 515 is greater than that in the latch 514, a signal line 517 will be active and the data in the latch 513 will be loaded to the latch 515, which operation being processed before the next HSYNC comes out after the first one has been generated. If the above mentioned comparing operation is performed on the entire image, the minimum value in the X direction of the original will be left in the latch 515, the value being denoted by $X_3$. Also, when the signal line 517 is actuated, the value from the sub-scan counter is loaded to a latch 518, the value being $Y_3$.

The values which are present in the main- and sub-scan counters at that time are loaded to latches 519 and 520 every time 8-bit white data appears during scanning over the entire image, which means that at the completion of the pre-scanning of the original, count values obtained when the last 8-bit white data appears are left in the counters, said values denoting $(X_4, Y_4)$.

The data lines of the above mentioned eight latches 506, 511, 520, 518, 505, 510, 515 and 519 are connected to the bus line of the CPU, so that the CPU reads these data upon the completion of pre-scanning, discriminates the area within $X_2$, $X_3$, $Y_1$ and $Y_4$ as the area within which the original is placed, and performs the trimming (for example, the remaining area is printed in white, the above mentioned area is automatically enlarged to the size which is similar to or almost the same as that of a sheet, or the area is automatically shifted so as to be placed in the central position on the sheet) during the original scanning operation for printing.

Figures 1, 7:
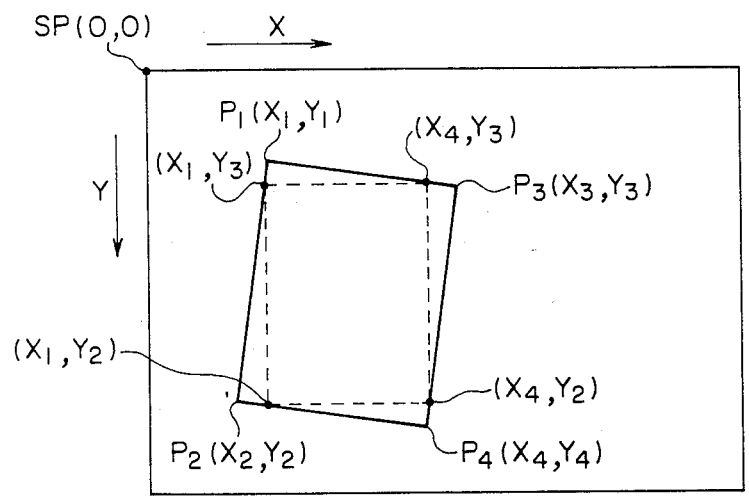
Figures 2, 6:
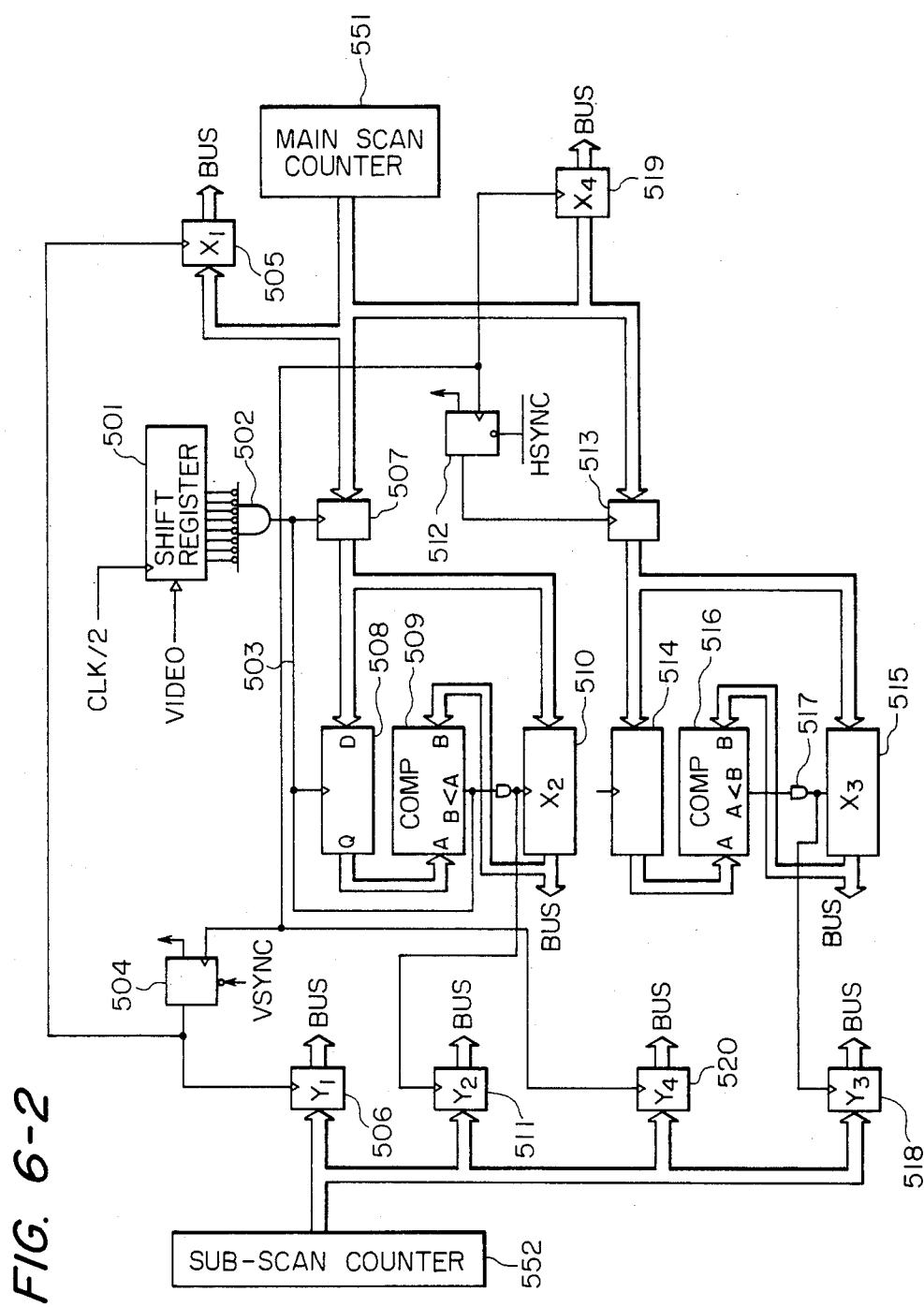
Figures 2, 7:
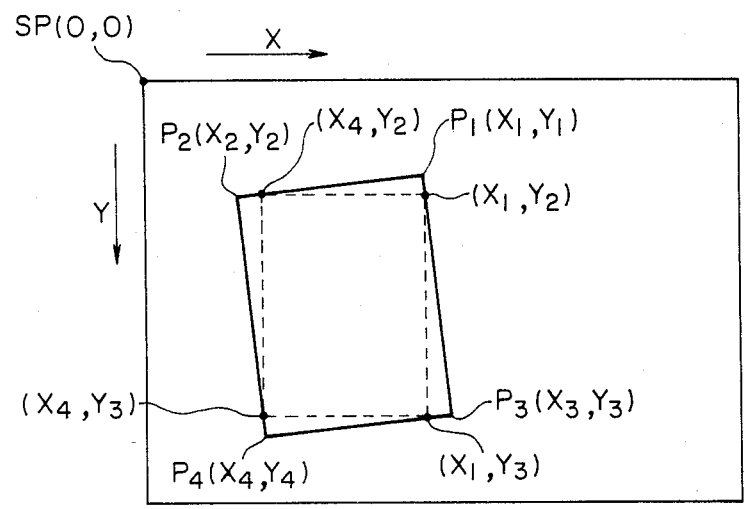

Also, as shown in FIGS. 7-1 and 7-2, the area within $X_1$, $X_4$, $Y_2$ and $Y_3$ may be considered as the original area and the trimming may be performed thereon. When the original is only slightly tilted, the trimming based on the area within $X_1$, $X_4$, $Y_2$ and $Y_3$ provides the copy output with almost no loss in the normal original information and with the surrounding area being omitted.

FIGS. 7-1 and 7-2 respectively show examples when $Y_2 > Y_3$ and $Y_3 > Y_2$. When no original is present, white data can not be detected and hence $X_1 = X_4 = 0$, by which the CPU can understand that no original is present. In this respect, the provision of a special purpose CCD for the original detection leads to the time saving (only the scanning time for coordinate detection, that is, the forward moving time is required) and hence the starting time of reproduction can be advanced and the CCDs for reading the original information can be started to scan at the end of the H) forward movement of the detection CCD.

Next, the detection of the original tilt will be described. Using the original positional coordinates $(X_1, Y_1)$, $(X_2, Y_2)$, $(X_3, Y_3)$ and $(X_4, Y_4)$ which are detected in the above mentioned manner and set in the individual latches in FIG. 6-2, the tilt of the original is calculated in the following manner, which is performed in accordance with a program shown by the flowchart in FIGS. 10A and 10B.

Figure 8:
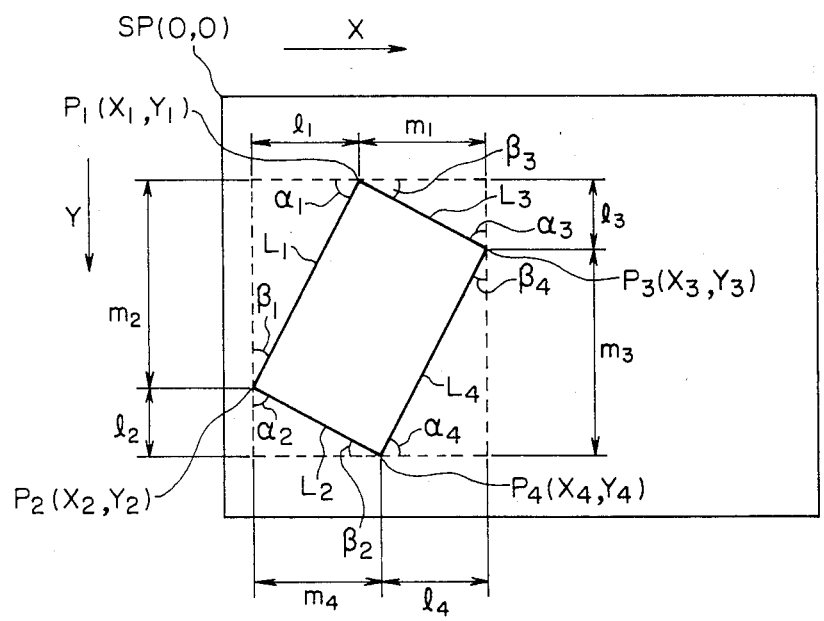

Since the individual coordinates have such relationships that $X_3 \geq (X_1, X_4) \geq X_2$ and $Y_4 \geq (Y_2, Y_3) \geq Y_1$, the distance in the X direction $l_1$ and the distance in the Y direction $m_2$ between points $P_1$ and $P_2$ shown in FIG. 8 are respectively given by $l_1 = X_1 - X_2$ and $m_2 = Y_2 - Y_1$.

Thus, the tilt of the side $L_1$ joining the points $P_1$ and $P_2$ is given by $\tan \alpha_1 = m_2/l_1$ or $\tan \beta_1 = l_1/m_2$, so that the tilt can be determined by calculating $m_2/l_1$ or $l_1/m_2$ by means of the CPU. In order to reduce the calculating time, $\max(l_1, m_2)/\min(l_1, m_2)$ is computed, a flag SEL 1 in a predetermined area in the RAM of the microcomputor 36 is set to "0" when $m_2 \geq l_1$ or when $\tan \alpha_1$ is calculated and the flag SEL 1 is set to "1" when $l_1 > m_2$ or when $\tan \beta_1$ is calculated, and the resultant $\max(l_1, m_2)/\min(l_1, m_2)$ is stored in a flag TAN 1 in the RAM area. Also, the tilt of the side $L_2$, that is, $\max(l_2, m_4)/\min(l_2, m_4)$; the tilt of the side $L_3$, that is, $\max(l_3, m_1)/\min(l_3, m_1)$; and the tilt of the side $L_4$, that is, $\max(l_4, m_3)/\min(l_4, m_3)$ are respectively stored in TAN 2 and SEL 2, TAN 3 and SEL 3, and TAN 4 and SEL 4 to obtain the tilts of the individual sides. If $\min(l_i, m_j)$, that is, a divisor is 0, the corresponding side $L_i$ is parallel with the X-axis or the Y-axis, so that 0 is stored in the TAN I without executing the division to set that the side $L_i$ is parallel or straight. Since the values of the coordinates $X_i$, $Y_j$ can be obtained in mm units, the minimum value of a dividend is 1 and the maximum value thereof is 432 from the maximum scanning width, so that the maximum value and the minimum value of the quotient are 432 and 1, respectively. As a result of the division, a fraction is omitted.

When TAN I=55, the tilt is about 89.775°, that is, about 0.225° which would be hardly discriminated by anyone as the tilt of the original. Thus, one byte is sufficient for the TAN 1 and the values more than 256 can be considered as 255.

When the original is rectangular, $\alpha_1 = \alpha_2 = \alpha_3 = \alpha_4$ and $\beta_1 = \beta_2 = \beta_3 = \beta_4$ and hence TAN 1=TAN 2=TAN 3=TAN 4, so that either one of them may be used as the data for determining the tilt.

In view of the read error and the practical conveniences, there exists such a method that the max TAN I is adopted as the tilt judging data and the original is considered parallel when one of the sides $L_1$ to $L_4$ is the most parallel with the axis.

Also, there may exist such a method that when the inner or right side viewing from the original mount, that is, the side $L_1$ or $L_3$ is parallel with the axis, the original is considered to be parallel as in a conventional copying machine and the TAN 1 or TAN 3 is used as the tilt judging data.

Further, such a way of thinking may exist, that the min TAN I is used as the tilt judging data and the original is considered to be parallel only when all the sides are parallel with the axis. The greater the data TAN I (except 0) which is selected for judging the tilt in accordance with any one of the above mentioned methods, the more it is parallel with the axis, so that the threshold value ALFA is properly settled with respect to the TAN I and it is judged that the original is not tilted when TAN I≧ALFA or TAN I=0, while the original is tilted when TAN I<ALFA. ALFA is of a value from 0 to 255, so that the greater the ALFA, the stricter the judgement.

Next, the sequence of the tilt judgement, warning and display, when the tilt of the side $L_1$, TAN 1, and the tilt of the side $L_3$, TAN 3, are used as the tilt judging data, will be described with reference to the flowchart for the CPU shown in FIGS. 10A and 10B. After the power switch is turned on and the copy mode is reset to the reference mode (which is displayed on the display 202 as shown in FIG. 11-3) such as the real size, if any key except COPY START is entered in the main control unit 100, the preset unit 300 and the soft key unit 200 (Step 1), the data for that key is entered into the memory (Step 2), by which any key mode may be set. Then, if the COPY START key 102 is entered, the pre-scanning for detecting the coordinates of the original position is executed (Step 3). As a result, the eight coordinates $X_1$ to $X_4$ and $Y_1$ to $Y_4$ indicating the position of original detected by the circuit shown in FIG. 6-2 are fetched from the associated latches to the CPU through the data bus (Step 4). When $X_1=X_4$, it is judged that no original is present (Step 5) and the Warning 1 as shown in FIG. 11-1 is displayed on the liquid crystal display 202 to advise the operator that no original is present. Although the detailed description is omitted, no soft key entry is accepted during display of the Warning 1 and the Warning 1, although not shown, is cleared after a certain period of time passes or by the clear key 104 entry and the display is returned to the Normal Display shown in FIG. 11-3. While, when $X_1 \neq X_4$, it is judged that the original can be detected and TAN 1 and SEL 1 indicative of the tilt of the side $L_1$ and TAN 3 and SEL 3 indicative of the tilt of the side $L_3$ are set in accordance with the above mentioned algorithm (Steps 7 and 8).

Next, SEL 1 and SEL 3 are considered.

The relationships between SEL 1 and SEL 3 and between the sides $L_1$ and $L_3$ will be described with reference to FIGS. 12-1 to 12-4. The fact that SEL 1 =SEL 3 ="0" as shown in FIG. 12-1 means that the angles $\alpha_1$ and $\alpha_3$ in FIG. 8 are more than 45° and hence that CPU judges that the operator is about to place the sides $L_1$ and $L_4$ parallel with the Y and X axes, respectively. Accordingly, it is considered that the original is tilted less as the values of TAN 1 and TAN 3 become greater or when any one of them is 0. Likewise, the CPU considers that the operator is about to place the sides $L_1$ and $L_3$ parallel with the X and Y axes, respectively when SEL "1" =SEL 3 ="1" as shown in FIG. 12-4 and hence it can be considered that the original is placed straight more as the values of TAN 1 and TAN 3 become greater or when any one of them is 0. In these cases, no warning is displayed and a display indicating that a copy can be taken is made. In other case, that is, when TAN 1 and TAN 3 are less than ALFA, the degree is displayed on the display 202 as shown in FIG. 11-2. When SEL 1="0" and SEL 3="1" as shown in FIG. 12-2, it means that the angles $\alpha_1$ and $\beta_3$ are less than 45°, that is, the sides $L_1$ and $L_3$ are not orthogonal and hence it can be judged that a portion of the original is bent or the original is not of a normal rectangular configuration. Likewise, when SEL="1" and SEL 3="0" as shown in FIG. 12-3, the angles $\alpha_1$ and $\beta_3$ are greater than 45° and hence it can be considered that the sides $L_1$ and $L_3$ form an acute angle and hence the original is not rectangular.

Figure 10B:
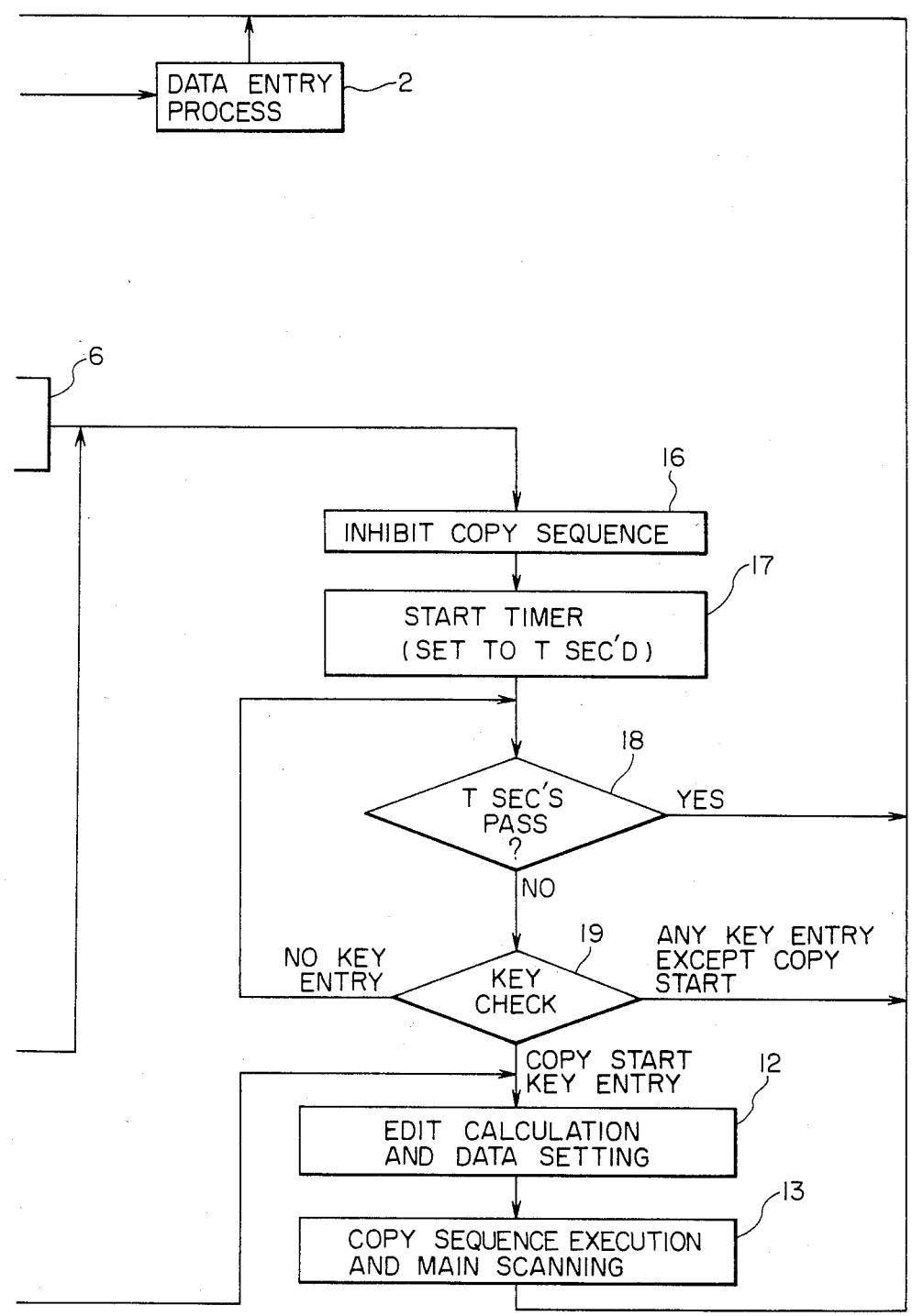

Further referring to the flowchart in FIGS. 10A and 10B, whether SEL 1 and SEL 3 are equal or not is considered (Step 9) and, if No, the Warning 2 is displayed as shown in FIG. 11-2. However, since the CPU can not decide which axis, X-axis or Y-axis, the operator intends to place the sides $L_1$ and $L_3$ parallel with, the angle of tilt ("5°" in FIG. 1-2) is not displayed. In particular, when SEL 1="0" and SEL 3="1", "ORIGINAL BENT" can be displayed. This display is cleared after a certain period of time or by the clear key 104 and it returns to the normal display as shown in FIG. 11-3.

On the other hand, when SEL 1 and SEL 3 are equal, which flag, TAN 1 or TAN 3, is "0" or not is considered (Step 11). For example, when SEL 1="0" and TAN 1="0", it can be judged that the side $L_1$ is parallel with Y-axis, while when SEL 3="0" and TAN 3="0", it can be judged that the side $L_3$ is parallel with X-axis. Likewise, if SEL 1="1" and TAN 1="0", the side $L_1$ is parallel with X-axis and if SEL 3="1" and TAN 3="0", the side $L_3$ is parallel with Y-axis. Thus, neglecting the state of other sides and attaching importance to the side which is parallel with the axis, calculation for edition and data setting for trimming, masking, magnification/reduction and image shifting are performed using the coordinate data (Step 12). Then, the original scanning is successively started and the sequence is executed. That is, after completing the pre-scanning for the detection of coordinates and returning to the home position, the scanning for read-out is started.

When both of TAN 1 and TAN 3 are not 0, whether a greater one is greater than the tilt threshold ALFA or not is considered (Step 14). Selecting the greater one from TAN 1 and TAN 3 is practical because it derived from the way of thinking that it is good enough if either one of them can be judged to be parallel with the X-axis or the Y-axis. When max(TAN 1, TAN 3)>ALFA, it can be considered that the original is not tilted and the copy sequence is executed after the calculation for edition and the data setting. ALFA may be predetermined or the operator may preset it by using the ten data keys.

On the other hand, when even a larger one of TAN 1 and TAN 3 is smaller than ALFA, it is judged that the original is tilted and the warning is displayed on the display 202 as shown in FIG. 11-2 (Step 15). The degree of tilt is expressed in terms H) of numeric value obtained by subtracting the arc tangent (degree) of a larger one of TAN 1 and TAN 3 from 90°. For example, when max(TAN 1, TAN 3) =11, the arc tangent thereof is 84.8 as shown in the table in FIG. 9. Thus, "5°" (90−84.8=5.2) is displayed on the display 202. The table in FIG. 9 is stored in the ROM in advance and the operator can correct the tilt of the original as desired by looking into the values in the table. After the Warning 1 is displayed when no original is present or the Warning 2 is displayed when the original is tilted in the above mentioned manner, the execution of the copy sequence is temporarily inhibited (Step 16) and a timer (set to T seconds) is started (Step 17). And, when any key except the copy start key is not entered and the copy start key is entered again before the timer times up (Steps 18 and 19), the calculation and data setting for edition are performed using the detected data on $X_1$ to $X_4$ and $Y_1$ to $Y_4$ and then the execution of the copy sequence is started to start the main scanning. That is, even when a warning is given, the copying can be forcibly performed.

If any other key (for example, stop key or clear key) is entered or the timer counts up before the copy start key entry, it is returned to the key checking (the Step 1) and coordinate detecting (the Step 3) routines.

Thus, a copying machine or data transfer system which eliminates useless copying operation or useless data transfer can be realized.

When it is desired to copy an original of any configuration other than rectangle or to copy the original in the intentionally tilted state, the copy start key is repeatedly pressed two times, by which the repetitive pressing of the copy start key is recognized in the Step 1 in FIG. 10A thereby jumping to the Step 12.

When the ADF adapted to automatically feed and discharge the originals is equipped, such inconveniences would be present. Since the copy start keys are provided both in the ADF and the body, the original can be fed out from the feed tray in the ADF and the reader can be started interlocking therewith by the start key in the ADF. However, if the copy start key in the body is erroneously pressed, no original is supplied from the feed tray and the reader takes a number of blank sheets of copy even when the originals are set in the feed tray in the ADF. If the back of the ADF (back of the original conveyor belt) is mirror finished or colored dark as in the embodiment of the present invention, the pre-scanning for detecting the presence of the original is temporarily performed by pressing the copy start key in the body, so that it can be detected that no original is present and the original H) feed command can be sent from the body to the ADF, by which the original can be supplied only when no original is present on the platen. Accordingly, when no original is present on the platen, the ADF can also be started by pressing the copy start key in the body and useless copying can be avoided. When any original is already present on the platen, the original is scanned before the ADF is started and at the completion of scanning, the ADF is started to replace the original with another one.

In the step 12, as an example of the calculation and data setting for edition, the print position data are calculated from the coordinate data of $X_1$ to $X_4$ and $Y_1$ to $Y_4$ and the result is stored in order to print the original image in the center of a sheet (centering). That is, the read-out address from the shift memory in FIG. 5-2 is determined from the difference between the central data of the original coordinates and the central address data in the memory such that the printed image may be centered on the sheet. As another example, the print positional data are calculated from the individual coordinate data in order to print the image with reference to the corners of a sheet (cornering), in which the read-out address from the shift memory is determined from the difference between the coordinate data and the corner address data. As a further example, the print positional data are H) calculated from the individual coordinate data and stored in order to print the image in any given position on a sheet (random shifting), in which the read-out address from the memory is determined from the difference between the coordinate data and the inputted data of the designated shift position. As still a further example, the read-out data is gated before or after the address corresponding to the detected coordinates upon the read-out from the shift memory in order to whiten the area around the original (masking). As still a further example, the size of the original is determined from the detected coordinates, the magnification/reduction scale is calculated from the size thus decided and the sheet size, and the resultant data is stored in order to make the size of the original image coincident with that of the sheet (automatic magnification/reduction) or the data for selecting the sheet cassette in the printer B is stored in order to select a sheet which would be in coincidence with the original image in size.

Accordingly, in the Step 13, the printing of an image which is editted in various manners in accordance with the data thus stored is possible.

Also, in the Step 13, there also exist such sequences by which the image data can be filed in an optical disc and the image data can be coded so as to be transferred over a great distance and it is also possible to control these sequences in the above mentioned manner depending on the state of the original.

What is claimed is:

1. An image processing system for processing an image of an original document, said system comprising:
    means for detecting position coordinates of at least two corners of the original document relative to a coordinate system and for producing a detection signal representing the position coordinates;
    means for discriminating an angle of obliqueness relative to the coordinate system in accordance with the detection signal produced by said detecting means;
    means for inhibiting the image processing operation of said image processing system when the angle discriminated by said discriminating means is greater than a predetermined angle; and
    means for releasing an inhibition state of the image processing operation inhibited by said inhibiting means and for allowing the image processing operation even when the discriminated angle is greater than the predetermined angle.

2. An image processing system as defined in claim 1, further comprising
    means for displaying the angle of obliqueness of the original document discriminated by said discriminating means.

3. An image processing system as defined in claim 1, further comprising:
    means for displaying a warning in accordance with discrimination by said discriminating means.

4. An image processing system as defined in claim 1, further comprising:
    means for controlling the image processing operation of said image processing system in accordance with discrimination by said discriminating means.

5. An image processing system as defined in claim 1 wherein said detecting means corresponds to reading means for reading the image of the original document to convert the image into an electric signal to be processed to reproduce an image signal.

6. An image processing system for processing an image of an original document, said system comprising:
    means for detecting position coordinates of plural corners of the original document relative to a coordinate system and for producing a detection signal representing the position coordinates;
    means for discriminating angles of plural edges of the original document relative to the coordinate system in accordance with the detection signal produced by said detecting means;
    means for recognizing when the original document is bent in accordance with the angles discriminated by said discriminating means; and
    means for controlling the image processing operation of said system in accordance with recognition by said recognizing means.

7. An image processing system as defined in claim 10, further comprising:
    means for displaying a warning in accordance with recognition by said recognizing means.

8. An image processing system as defined in claim 6, wherein said controlling means inhibits the image processing operation of said system in accordance with recognition by said recognizing means.

9. An image processing system as defined in claim 6, wherein said detecting means comprises:

reading means for reading the image of the original to convert the image into an electric signal to be processed to reproduce an image signal.

10. An image processing system for processing an image of an original document, said system comprising:
 means for reading the image of the original document to convert the image into an electric signal;
 means for discriminating an angle of obliqueness of the original document in accordance with the electric signal from said reading means;
 means for inhibiting the reading operation of said reading means when the angle discriminated by said discriminating means is greater than a predetermined angle; and
 means for releasing an inhibition state of the reading operation inhibited by said inhibiting means and for allowing the image reading operation even when the discriminated angle is greater than the predetermined angle.

11. An image processing system as defined in claim 10, further comprising means for displaying the angle of the obliqueness of the original document discriminated by said discriminating means.

12. An image processing system as defined in claim 10, further comprising means for displaying a warning in accordance with discrimination by said discriminating means.

13. An image processing system as defined in claim 10, wherein said discriminating means comprises means for detecting position coordinates of at least two corners of the original document relative to a coordinate system.

14. An image processing system for processing an image of an original document, said system comprising:
 means for reading the image of the original document to convert the image into an electric signal;
 means for discriminating angles of plural edges of the original document in accordance with the electric signal from said reading means;
 means for recognizing when the original document is bent in accordance with the angles discriminating by said discriminating means; and
 means for controlling the reading operation of said reading means in accordance with recognition by said recognizing means.

15. An image processing system as defined in claim 14, further comprising means for displaying a warning in accordance with the recognition by said recognizing means.

16. An image processing system as defined in claim 14, wherein said controlling means inhibits the reading operation of said reading means in accordance with the recognition by said recognizing means.

17. An image processing system as defined in claim 14, wherein said discriminating means comprises means for detection position coordinates of plural corners of the original document relative to a coordinate system.

18. An image processing system for processing an image of an original document, said system comprising:
 a platen on which the original document is placed;
 sensor means for receiving light from said platen to produce an electric signal corresponding to the light;
 means for discriminating an angle of obliqueness of the original document on said platen in accordance with the electric signal from said sensor means;
 means for inhibiting the image processing operation of said image processing system when the angle discriminated by said discriminating means is greater than a predetermined angle; and
 means for releasing an inhibition state of the image processing operation inhibited by said inhibiting means and for allowing the image processing operation even when the discriminated angle is greater than the predetermined angle.

19. An image processing system as defined in claim 18, further comprising means for displaying the angle of the obliqueness of the original document discriminated by said discrimination means.

20. An image processing system as defined in claim 18, further comprising means for displaying a warning in accordance with discrimination by said discriminating means.

21. An image processing system as defined in claim 18, wherein said discriminating means comprises means for detecting position coordinates of at least two corners of the original document relative to a coordinate system.

22. An image processing system as defined in claim 18, wherein said sensor means is adapted to produce an electric signal representing the image of the original document.

23. An image processing system for processing an image of an original document, said system comprising:
 a platen on which the original document is placed;
 sensor means for receiving light from said platen to produce an electric signal corresponding to the light;
 means for discriminating an angle of plural edges of the original document on said platen in accordance with the electric signal from said sensor means;
 means for recognizing when the original document is bent in accordance with the angles discriminated by said discriminating means; and
 means for controlling the image processing operation of said system in accordance with recognition by said recognizing means.

24. An image processing system as defined in claim 23, further comprising means for displaying a warning in accordance with the recognition by said recognizing means.

25. An image processing system as defined in claim 23, wherein said controlling means inhibits the reading operation of said reading means in accordance with the recognition by said recognizing means.

26. An image processing system as defined in claim 23, wherein said discriminating means comprises means for detection position coordinates of plural corners of the original document relative to a coordinate system.

27. An image processing system as defined in claim 23, wherein said sensor means is adapted to produce an electric signal representing the image of the original document.

* * * * *

UNITED STATES PATENT AND TRADEMARK OFFICE
CERTIFICATE OF CORRECTION

PATENT NO. : 4,802,229
DATED : January 31, 1989
INVENTOR(S) : MASANORI YAMADA

It is certified that error appears in the above-identified patent and that said Letters Patent is hereby corrected as shown below:

ON THE TITLE PAGE
IN [57] ABSTRACT

Line 6, "papers," should read --paper,--.

COLUMN 2

Line 60, "mirrors 907" should read --mirror 907--.

COLUMN 3

Line 31, "collimetor" should read --collimator--.
    Line 36, "collimetor" should read --collimator--.
    Line 46, "through" should read --by--.

COLUMN 4

Line 12, "control consol A-1" should read --control console A-1--.
    Line 60, "ROM" should read --ROM,--.
    Line 61, "CPU 37" should read --CPU, 37--.

COLUMN 5

Line 3, "first mirror 7" should read --first mirror 907.--.
    Line 21, "microcomputor 36." should read --microcomputer 36.--
    Line 24, "presets" should read --preset--.
    Line 30, "present" should read --presence--.
    Line 37, "memorys" should read --memories--.

UNITED STATES PATENT AND TRADEMARK OFFICE
CERTIFICATE OF CORRECTION

PATENT NO. : 4,802,229
DATED : January 31, 1989
INVENTOR(S) : MASANORI YAMADA

It is certified that error appears in the above-identified patent and that said Letters Patent is hereby corrected as shown below:

COLUMN 6

Line 49, "8-bit white" should read --8-bit white data--.

COLUMN 7

Line 17, "being $Y_3$." should read --being denoted by $Y_3$.--.
Line 23, "denoting $(X_4, Y_4)$." should read --being denoted by $(X_4, Y_4)$.--
Line 54, "H)" should be deleted.

COLUMN 8

Line 7, "putor 36" should read --puter 36--.
Line 27, "TAN I=55," should read --TAN I=255,--.

COLUMN 9

Line 51, "SEL="1" " should read --SEL 1="1"--.
Line 62, "FIG. 1-2)" should read --FIG. 11-2)--.

COLUMN 10

Line 34, "H)" should be deleted.

COLUMN 11

Line 17, "H)" should be deleted.
Line 43, "H)" should be deleted.
Line 63, "editted" should read --edited--.

UNITED STATES PATENT AND TRADEMARK OFFICE
CERTIFICATE OF CORRECTION

PATENT NO. : 4,802,229

DATED : January 31, 1989

INVENTOR(S) : MASANORI YAMADA

It is certified that error appears in the above-identified patent and that said Letters Patent is hereby corrected as shown below:

COLUMN 12

Line 24, "comprising" should read --comprising:--.
    Line 59, "claim 10," should read --claim 6,--.

COLUMN 13

Line 44, "discriminating" should read --discriminated--.
    Line 59, "detection" should read --detecting--.

COLUMN 14

Line 19, "discrimination" should read --discriminating--.
    Line 58, "detection should read --detecting--.

Signed and Sealed this

Twenty-sixth Day of December, 1989

Attest:

JEFFREY M. SAMUELS

*Attesting Officer*     *Acting Commissioner of Patents and Trademarks*